United States Patent [19]
Sohma et al.

[11] Patent Number: 4,653,998
[45] Date of Patent: Mar. 31, 1987

[54] FURNACE SYSTEM

[75] Inventors: Ken-ichi Sohma; Norio Arashi; Shigeru Azuhata, all of Hitachi; Kiyoshi Narato, Ibaraki; Tooru Inada; Hironobu Kobayashi, both of Hitachi; Keizou Ohtsuka, Katsuta; Yukio Hishinuma, Hitachi, all of Japan

[73] Assignees: Hitachi, Ltd.; Babcock-Hitachi Kabushiki Kaisha, both of Tokyo, Japan

[21] Appl. No.: 694,744

[22] Filed: Jan. 25, 1985

[30] Foreign Application Priority Data

Jan. 27, 1984 [JP] Japan .................................. 59-11845

[51] Int. Cl.⁴ ................................................ F23N 5/08
[52] U.S. Cl. .......................................... 431/79; 431/12; 110/186; 110/216; 250/554; 356/315
[58] Field of Search ................... 431/79, 12, 75, 3, 29; 236/15 BD; 250/554; 356/315; 110/216, 217, 186, 266

[56] References Cited

U.S. PATENT DOCUMENTS 3,080,708 3/1963 Carr ....................................... 431/79
3,583,844 6/1971 Smith ..................................... 431/79
4,043,742 8/1977 Egan et al. ......................... 431/79 X
4,059,385 11/1977 Gulitz et al. ....................... 431/79 X
4,410,266 10/1983 Seider ................................ 431/79 X
4,415,264 11/1983 Wittmer ............................... 356/315

FOREIGN PATENT DOCUMENTS 2326067 12/1973 Fed. Rep. of Germany ........ 431/79
46927 4/1981 Japan ..................................... 431/29
24119 2/1984 Japan ..................................... 431/79

Primary Examiner—Margaret A. Focarino
Attorney, Agent, or Firm—Antonelli, Terry & Wands

[57] ABSTRACT

A furnace system connected to a burner including a furnace for burning a fuel and air ejected from the burner into the furnace to produce a flame therein, and a combustion condition determining device for determining the conditions of combustion of the fuel in a zone of the flame extending along different strata thereof by collecting light in the flame at one point in the flame by moving such point. Signals outputted by the combustion condition determining device are utilized for monitoring or controlling the flame and controlling exhaust emission control devices for controlling exhaust emissions produced by the combustion of the fuel. Control of the conditions of combustion of the flame can be effected quickly with a high degree of precision by monitoring the flame.

8 Claims, 21 Drawing Figures

FIG. 16-a
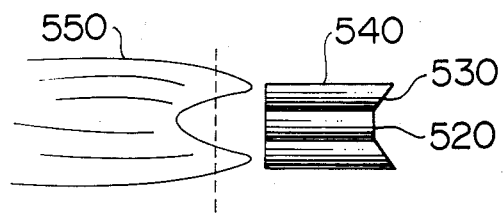
FIG. 16-b
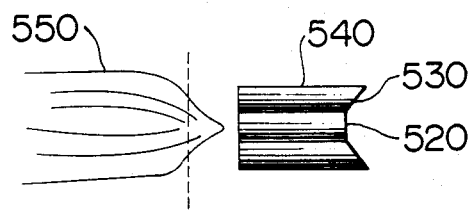
FIG. 16-c
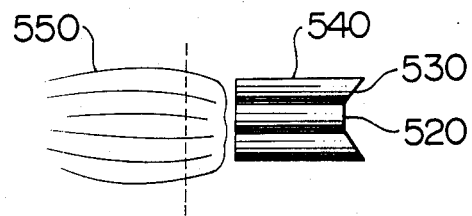

FURNACE SYSTEM

BACKGROUND OF THE INVENTION

1. Field of the Invention

This invention relates to a furnace system suitable for use with a boiler using pulverized coal as a fuel for monitoring or controlling flames produced by the combustion of the pulverized coal or for controlling an exhaust treating apparatus connected to the boiler.

2. Description of the Prior Art

Generally, it has hitherto been usual practice to effect control of the flames produced by the combustion of a fuel in a boiler by a method wherein components of exhaust gases are analyzed and a signal is outputted to a control system in accordance with the results of the analyses performed.

Assume that it is desired to determine the concentration of the oxides of nitrogen (hereinafter NOx) in the exhaust gases, for example. To this end, it has been usual practice to introduce exhaust gases from a flue to various types of NOx meters to determine the concentration of the NOx. When it is impossible to directly lead the exhaust gases to the measuring instruments, sampling syringes resembling hypodermic syringes are used for collecting samples of the exhaust gases from the flue and the collected samples are fed into the sample inlets of the NOx measuring instruments to determine the concentration of NOx. Regardless of which method is used, samples of the exhaust gases are collected and analyzed to produce a control signal based on the results of the analysis, to thereby control the exhaust emission of the boiler. In addition to NOx, carbon monoxide, oxygen and sulfurous acid gas are noxious components of the exhausts that should be monitored. These gases have also been controlled by analyzing the exhaust gases led from the flue and producing control signals based on the results of the analyses. However, this method has suffered the disadvantage that since the exhaust gases are actually led from the flue to the measuring instruments, difficulties are experienced in coping with a sudden change in the conditions of combustion which might occur when the flames are converted to nonsteady flames that have lifted from the burner tip.

Another problem that should be grappled with when pulverized coal is used as a fuel is that it is important to minimize the amount of non-combusted coal in the ash from the point of view of avoiding environmental pollution and saving resources. When flames are produced by combusting pulverized coal, it is necessary that control of the flames be effected by monitoring the same to keep the combustion in a condition of the high efficiency by minimizing the amount of non-combusted coal. To determine the amount of non-combusted coal in the ash, it has hitherto been usual practice to collect samples of ash directly from the flue and measure the weight of a predetermined amount of ash, and then burn the samples of ash in perfect combustion in oxygen atmosphere (heating the sample ashes to 850° C. by raising the temperature 10°–20° C. every minute to perform combustion) before measuring the weight again. Thus, the amount of the non-combusted coal is determined by deducting the weight of the ash obtained by the perfect combustion from the weight of the ash before subjected to the perfect combustion. This process is time-consuming and troublesome because it involves the use of a differential heat indicating balance and other instruments in a multiplicity of steps, so that it is impossible to effect control of flames in on-line real time control operations by feeding back the amount of non-combusted coal determined in the ash. Thus, it is also impossible for this method to cope with a sudden change in the conditions of combustion.

The methods of the prior art described hereinabove are intended to effect control of the flames produced by the combustion of the pulverized coal by relying on the analysis of exhaust gases or dust collected at the outlet of the combustion furnace. Therefore, it is impossible for these methods to take necessary measures by coping with a sudden change in the conditions of combustion. In view of the foregoing, one might think of making observations of the flames themselves in an effort to perform control as precisely as possible. More specifically, a control method may be used wherein one would keep the flames in an optimum condition by controlling the conditions of combustion based on the distribution of the concentration of gases and the distribution of temperature in the vicinity of the flame port of the burner. Usually, the distribution of the concentration of gases in the vicinity of the flame port of the burner is determined by inserting a sampling probe in the flames and obtaining samples of gases for testing, and the distribution of temperature is determined by inserting thermocouples in the flame. However, it is difficult to make accurate determinations by these methods because the flames are disturbed. In determining the distribution of the gases by obtaining their samples, the components of the gases in each of the sampling probes might react with each other ($2CO+O_2 \rightarrow 2CO_2$, for example), thereby making it impossible to accurately determine the distribution of the gases. Difficulties would also be experienced in determining the temperature distribution because of changes in temperature which might possibly occur due to radiation of heat by the furnace walls in addition to changes in the temperature of the flames themselves. All in all, it would be considered difficult to accurately determine the conditions of combustion by the methods of the prior art which rely on information including the distribution of the concentration of gases in the vicinity of the flame port of the burner and the distribution of temperature in the furnace.

SUMMARY OF THE INVENTION

1. Object of the Invention

This invention has been developed for the purpose of obviating the aforesaid disadvantages of the prior art. Accordingly, the invention has as its object the provision of a furnace system which enables control of combustion to be effected accurately in a manner to be able to adequately cope with a sudden change in the combustion conditions based on accurate determination of the conditions of combustion by observing the flame.

2. Statement of the Invention

According to the invention, there is provided a furnace system comprising a furnace for burning a fuel ejected from a burner, combustion condition determining means for determining the conditions of combustion of the fuel in a zone of a flame extending through different strata thereof as the flame is produced in the furnace, and means for monitoring or controlling the flame and controlling exhaust emission control means connected to the furnace flue thereto by utilizing signals outputted by the combustion condition determining means.

By using the furnace system of the construction described hereinabove, light emitted by a flame is collected in a zone thereof extending through different flame layers and subjected to spectroscopic observations to select a specific band of wavelengths and the intensity of light and the pattern of emission of the light in the specific band of wavelengths are determined to obtain information about the temperature and air ratio of the flame produced by the combustion of the fuel, the concentrations of NOx, carbon monoxide, oxygen and hydrogen in the exhaust gases produced by the combustion of the fuel and the amount of non-combusted fuel in the ash in the dust, so that the conditions of combustion of the fuel producing the flame can be determined based on such information. Based on the conditions of combustion determined as noted hereinabove, the amounts of air and fuel ejected from the burner into the furnace and the angle at which the air and fuel are scattered are regulated to bring the flame to an optimum condition or to control denitration means or dust collecting means whereby control of exhaust emissions can be satisfactorily effected.

BRIEF DESCRIPTION OF THE DRAWINGS

FIGS. 16-a, 16-b and 16-c are views in explanation of normal and abnormal flames;

DESCRIPTION OF THE PREFERRED EMBODIMENT

Figure 1:
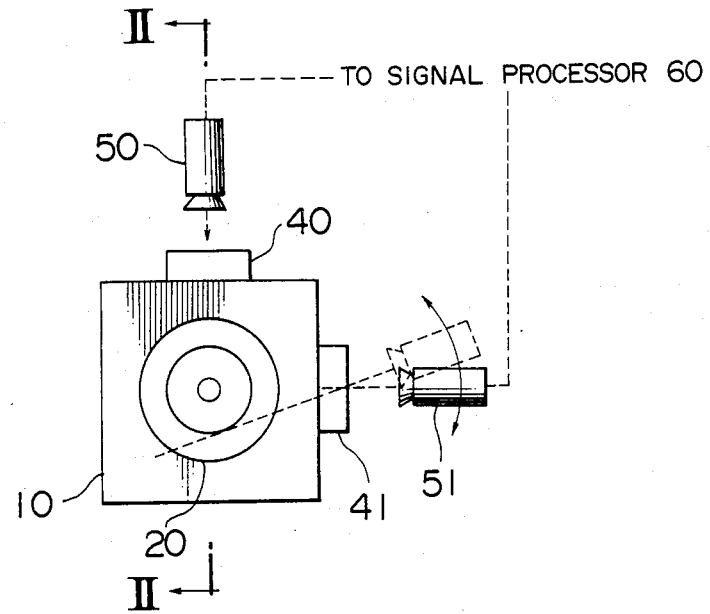
FIG. 1 is a front view of the furnace system incorporating therein the present invention, showing one example of collecting light in a zone of a flame produced by combustion.
Figure 2:
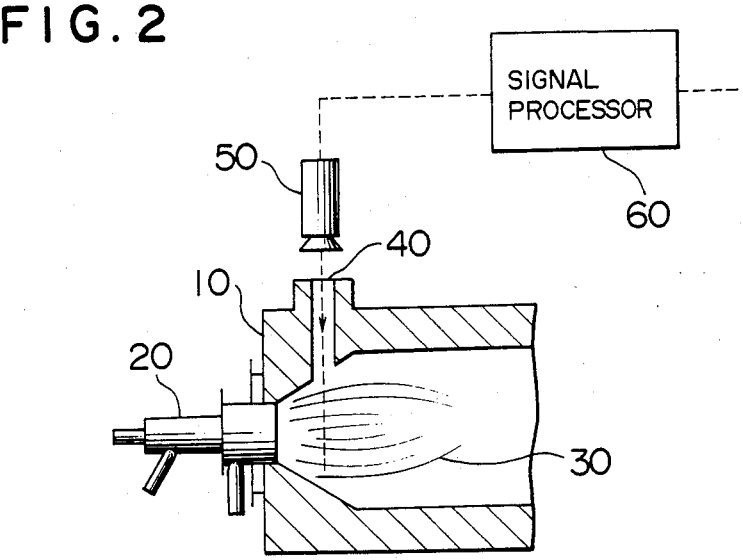
FIG. 2 is a sectional view taken along the line II—II in FIG. 1.

FIGS. 1 and 2 show the vicinity of a zone of a flame in which light is collected in the furnace system according to the invention. A furnace 10 has attached thereto a burner 20 from which a flame 30 extends into the interior of the furnace 10. Light emitted by the flame 30 is collected through a view ports 40 and 41. The light beams thus collected are converted by cameras 50 and 51 to electric signals which are led to a signal processor 60. Upon receiving the electric signals from the cameras 50 and 51, the signal processor 60 outputs a control signal.

Figure 3:
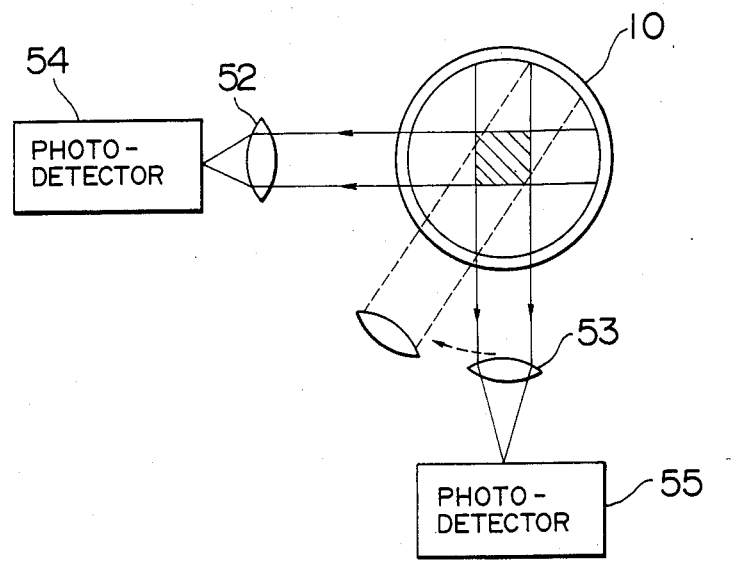
FIGS. 3 and 4 are views in explanation for the principles of the light collecting optical system.
Figure 4:
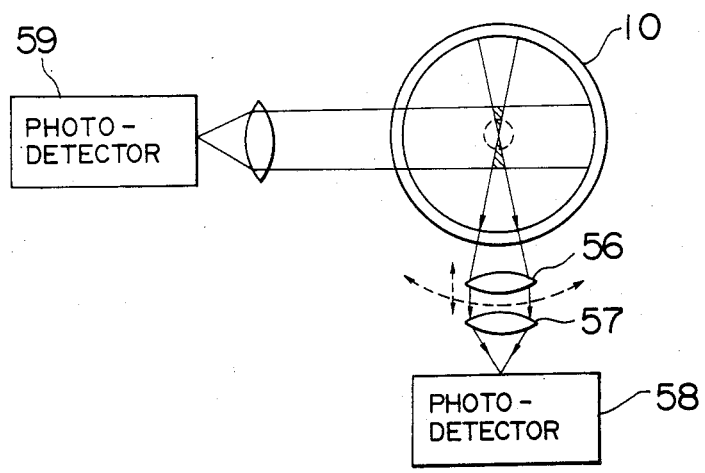

Referring to FIGS. 3 and 4, there is shown a condensing optical system which will be described to explain the principles of collecting light in the furnace system according to the invention. Generally, a convex lens functions to bring together light rays incident thereon as parallel light rays to bring them into focus. More specifically, light incident on convex lenses 52 and 53 as light of parallel rays forms an image of high intensity at the focus. Thus, by placing photo-detectors 54 and 55 in positions in which the light rays are brought into focus, it is possible to obtain information contained in the parallel rays of light incident on the convex lenses 52 and 53. By combining the lens 52 with the detector 54 into a single device, it is possible to cause all the information contained in a zone of the parallel rays of light extending across the furnace 10 to be incident on the detector 54. If the lens 53 is combined with the detector 55 into another device and these two devices are combined into a single optical system as shown in FIG. 3 in which the two sets of parallel rays of light incident on the convex lenses 52 and 53 cross each other in the interior of the furnace 10, then the outputs of the detectors 54 and 55 can be inputted to a single processor to simultaneously process the information contained in the two sets of parallel rays of light. Thus, it is possible to process only the information contained in a hatched zone within the furnace 10 shown in FIG. 3 and to output the result of processing of the information from the single processor. Accordingly, when it is desired to obtain information about one zone of a flame of circularly symmetrical shape facing different flame strata, the end can be attained by moving one light of parallel rays as indicated by broken lines in FIG. 3 from a right end of the furnace 10 to a left end thereof.

The principles of gathering information about parallel rays of light are as described by referring to FIG. 3. In actual practice, however, it is necessary to increase the space resolving power. To this end, an optical system as shown in FIG. 4 may be used. In this optical system, the characteristic of the convex lens is utilized twice and only the light emitted by one point of a flame is condensed by the convex lens to be collected by a photo-detector 58. Light disposed slightly anterior and posterior to the focusing can also be condensed. Thus, by assembling the optical system shown in FIG. 3 with the optical system shown in FIG. 4 in such a manner that the optical path of the former is normal to that of the latter, it is possible to greatly increase the space resolving power in processing information because an output of the photo-detector 58 and an output of a photo-detector 59 can be simultaneously inputted to a single processing unit. In the case of the optical system shown in FIG. 4, a lens 56 may only be moved toward forth and back of lenses 56 and 57 and the photo-detector 58 may be moved leftwardly and rightwardly.

By collecting light by methods based on the principles shown in FIGS. 3 and 4, it is thus possible to obtain information about the conditions of combustion of a fuel in an arbitrarily selected position in the flame.

Figure 5:
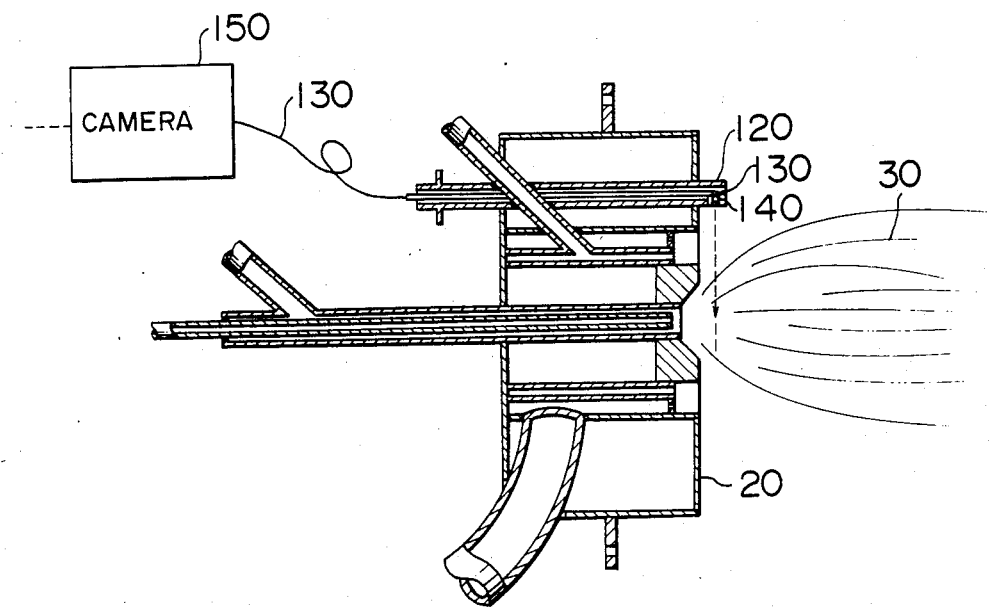
FIG. 5 is a vertical sectional view of a burner showing another example of collecting light in one zone of a flame distinct from the example shown in FIG. 1.

In the methods shown in FIGS. 3 and 4, the view points are used for collecting light. FIG. 5 shows an example in which a fiber attached to the burner is used for collecting light. More specifically, the burner 20 has attached to its main body a fiber 130 inserted in a cooling tube 120 for collecting light emitted by the flame 30 in the vicinity of a flame port of the burner 20. In this construction, the light collecting system is attached to the burner 30, so that no trouble occurs even if the furnace is large in size because no apertures are formed in the furnace. Light is collected by a condenser lens 140 of a large depth of field attached to an inlet end of the fiber 130 and led through the fiber 130 to a camera 150 for reproducing an image.

For converting an optical signal to an electric signal, an photoelectric transducer, such as a photomultiplier or a photodiode array may be used.

Figure 6:
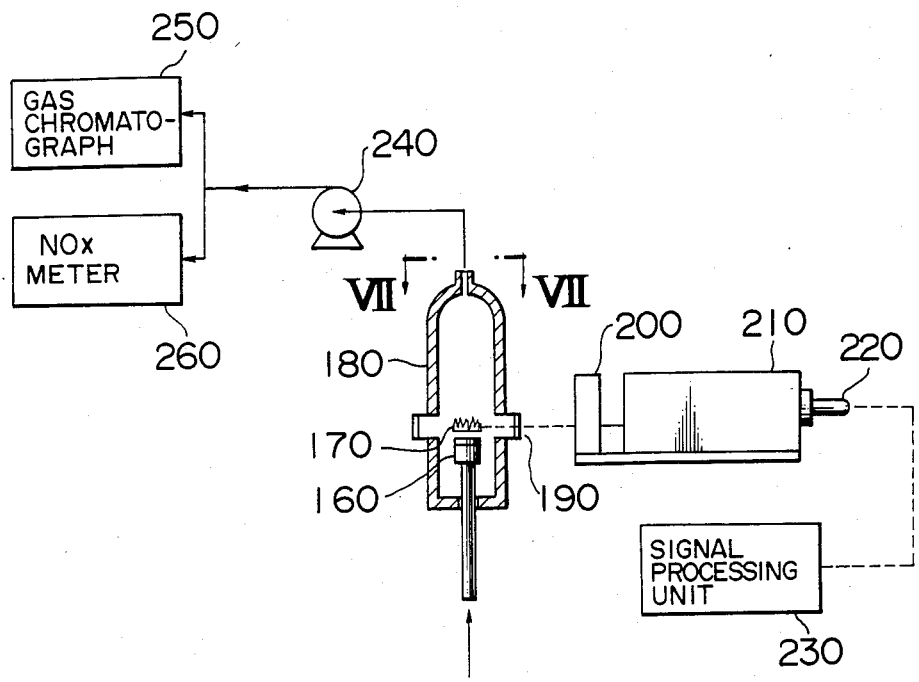
FIG. 6 is a view in explanation for experimental means for conducting on combustion of a gaseous fuel by using light collecting means.
Figure 7:
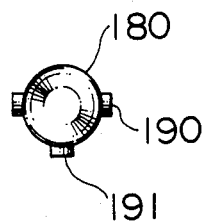
FIG. 7 is a sectional view taken along the line VII—VII in FIG. 6.
Figure 8:
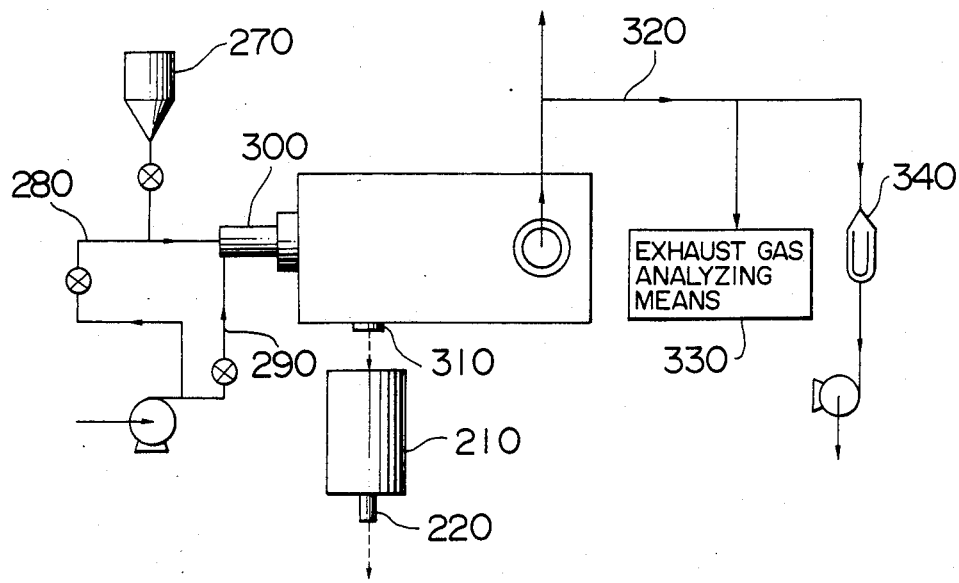
FIG. 8 is a view in explanation of means for conducting experiments on the combustion of pulverized coal by using light collecting means.

FIGS. 6-8 show examples of devices for conducting experiments for obtaining information about the conditions of combustion of the fuel based on the analyses of light collected by using the light collecting means described hereinabove. In FIGS. 6 and 7 in which gaseous fuel is burned in the burner 20, a premix of air and gaseous fuel is led to a burner 160 and combusted to form a flame 170. Light emitted by the flame 170 is collected through a plurality of light collecting windows 190 and 191 formed in a furnace 180. After being collected, the light beam is led through high sensitive optical means 40 (chopper) 200 to spectroscopic means 210 to obtain a spectrum of light radiation of desired wavelengths whose intensity is converted by a photomultiplier 220 to an electric signal which is led to a signal processing unit 230. Exhaust gases of combustion are drawn by suction by means of a pump 240 and tested by means of a gas chromatograph 250 for oxygen, hydrogen and carbon monoxide while NOx in the exhaust gases is determined by means of an NOx meter 260 of a type for measuring light of chemical origin.

In FIG. 8 in which pulverized coal is used as a fuel, the pulverized coal supplied from a hopper 270 is pneumatically transported by pulverized coal transporting air 290 to a burner 300 and mixed with combustion air 290 in the vicinity of a flame port of the burner 300 to form a flame. Light emitted by the flame is led through a view port 310 to the spectroscopic means 210 to obtain a spectrum of light radiation of desired wavelengths and its intensity is converted by the photomultiplier 220 to an electric signal which is led to the signal processing unit 230.

Exhaust gases are led through a flue 320 to exhaust gas analyzing means 330 including an NOx meter, an oxygen densitometer and a carbon monoxide densitometer to perform analyses of the exhaust gases. With regard to dust, samples of ash produced by the combustion of the pulverized coal are obtained from the flue 320 by a dust sampling instrument 340, and the amounts of non-combusted coal in the samples of dust are measured by using a differential heat indicating balance.

Figure 9:
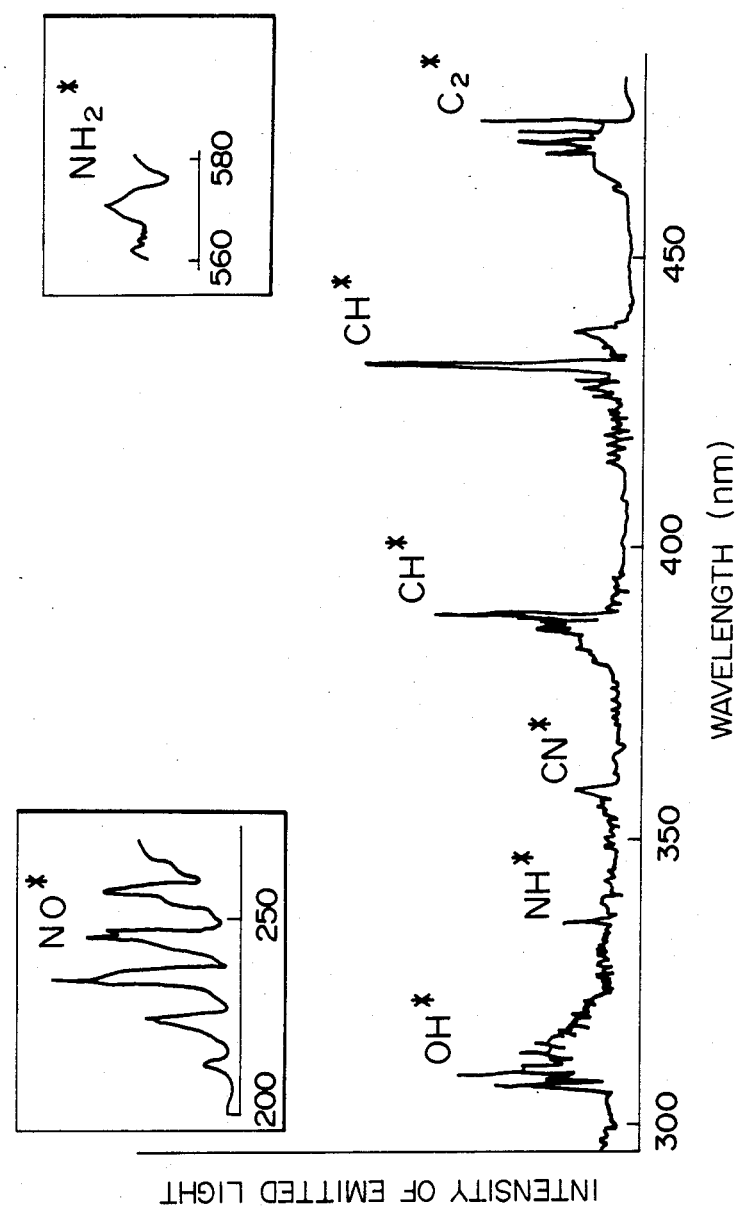
FIG. 9 is a diagrammatic representation of the results of spectroscopic observations of light emitted by a flame.

FIG. 9 shows the results of spectroscopic analyses of the light emitted by the flame produced by the combustion of gaseous fuel and pulverized coal performed by using the devices shown in FIGS. 6 and 8. In the diagram shown in FIG. 9, the abscissa represents the wavelength and the ordinate indicates the intensity of light emitted by the flame. The results show that chemical luminescence or light emitted by the OH radical, NH radical, CH radical, $C_2$ radical, $NH_2$ radical and NO can be observed in the flame. Thus, by using the wavelengths of light radiation in which the chemical luminescence occurs as specific wavelengths of light radiation, the intensity of light and the pattern of emission of the light of chemical origin in the specific wavelengths are determined to study the conditions of combustion of the fuel.

Figure 10:
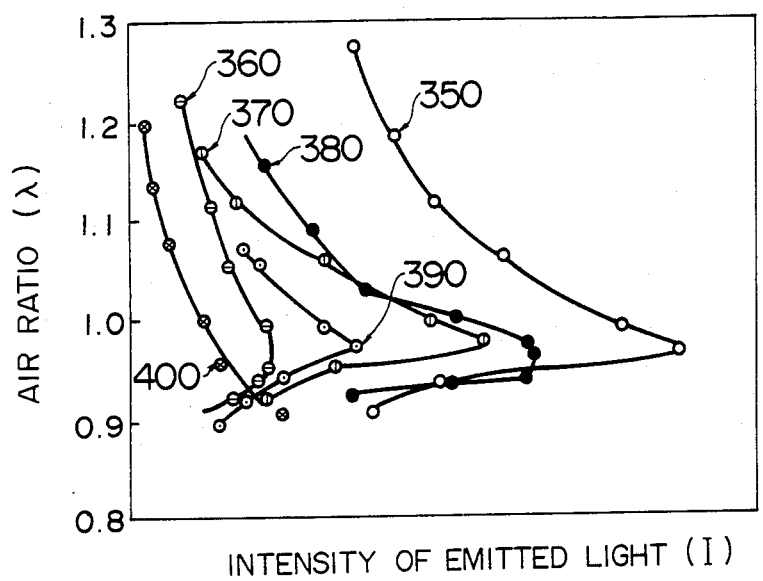
FIG. 10 is a diagrammatic representation of the relation between the intensity of light emitted by a flame produced by combustion and the air ratio of the flame.

FIG. 10 shows the relation between the intensity of light of the chemical origin described hereinabove and the air ratio of the flame produced by the combustion of the fuel. The air ratio has been obtained by calculating the concentrations of oxygen, carbon monoxide and hydrogen determined by the analyses of exhaust gases. The air ratio of the flame has been altered by varying the amount of air and the amount of fuel supplied to the burner.

In FIG. 10, an OH radical 350, a CH radical 360, a CN radical 370, an NO* radical 380 and an NH radical 390 have a maximum intensity of light where the air ratio is close to unity although they differ from each other in profile, and a $C_2$ radical 400 has a profile which is such that the intensity of light emitted thereby increases as the air ratio is reduced.

In view of the results obtained in determining the profile of emission of the light of chemical origin described hereinabove, it will be appreciated that the air ratio can be obtained with increased accuracy by studying in a coordinated fashion the intensity of light emitted by over at least one chemical source or the value of the differential coefficient $(d\lambda/dI)$ obtained at the point of intensity of the emitted light. Therefore, if the relation between the air ratio and the intensity of light emitted by each chemical source of light radiation is determined as shown in FIG. 10, it is possible to determine the air ratio at once without requiring calculation done on the concentrations of oxygen, carbon monoxide and hydrogen in the exhaust gases with a certain time difference. In analyzing exhaust gases; sampling of the gases is a time-consuming process.

Thus, if the relation between the air ratio and the intensity of light emitted by each chemical source is determined as shown in FIG. 10, then it is possible to obtain the air ratio at once by coping with a sudden change that might occur in the conditions of combustion of a fuel producing a flame which is under observation, thereby enabling combustion with a high degree of fuel efficiency and a minimum of environmental disruption to be achieved.

Figure 11:
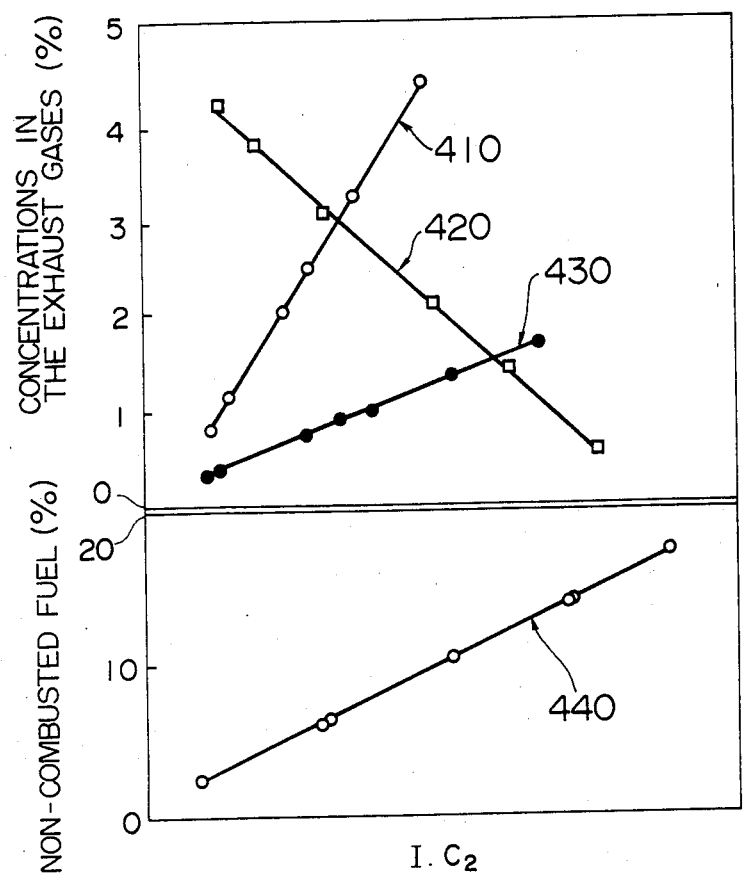
FIG. 11 is a diagrammatic representation of the intensity of light of the $C_2$ radical in relation to the concentrations of the gas components in the exhaust gases and the amount of non-combusted fuel in the ash.

FIG. 11 shows the intensity of light emitted by the $C_2$ radical in relation to the concentrations of gas components of exhaust gases and the amount of non-combusted fuel in the ash. The relation between the intensity of light emitted by the $C_2$ radical and the concentrations of gas components of exhaust gases has been obtained by the device for conducting experiments shown in FIG. 6. The corresponding relation obtained by the device shown in FIG. 8 has shown the same tendency.

The relation between the intensity of light emitted by the $C_2$ radical and the amount of non-combusted fuel in the ash has been determined by using the device shown in FIG. 8.

It has been found that there is a positive correlation between the intensity of light emitted by the $C_2$ radical and the concentration of hydrogen 430 and the concentration of carbon monoxide 410 in the exhaust gases. It has also been found that there is a negative correlation between the intensity of light emitted by the $C_2$ radical and the concentration of oxygen 420. Thus, the light emitted by this chemical source indicates the efficiency with which combustion takes place. That is, when the conditions of combustion are aggravated and the fuel burns in imperfect combustion, the concentration of carbon monoxide increases and hydrogen is detected. These gases are combustible gases which burn in the presence of oxygen. Therefor, if they are released to the atmosphere, environmental disruption will occur and energy will be wasted. Thus, it is important that the concentrations of these gases in the exhaust emission be reduced by controlling the combustion conditions of the fuel based on the observations of the intensity of light emitted by the $C_2$ radical.

With regard to the concentration of oxygen 420, feeding of oxygen to the burner in an amount greater than is necessary for effecting perfect combustion not only involves application of an overload to the air supplier but also lowers the temperature at which combustion takes place because combustion with excess oxygen caused by increased supply of air involves a supply of nitrogen which does not directly take part in combustion. Thus, it is also necessary to monitor the concentration of oxygen, to enable the combustion to take place with a high degree of efficiency.

Heretofore, it has been usual practice to collect samples of exhaust gases by leading the exhaust gases from the flue to the measuring instruments and analyse the samples to determine the concentrations of these gases, as described hereinabove. This method has suffered the disadvantage that a change that might occur in the conditions of combustion and cause the concentrations of gases to undergo a change is not detected until the gases in the furnace have all undergone the change in concentration and their samples reach the measuring instruments. Stated differentily, this method is unable to quickly cope with any change that might occur in the conditions of combustion, so that control of combustion conditions effected by this method has been very low in efficiency.

With regard to the amount of non-combusted fuel 440 in the ash, it has been found that there is a positive correlation between it and the intensity of light emitted by the $C_2$ radical as noted hereinabove. It is very important to monitor the amount of non-combusted fuel in the ash to enable the combustion to take place with a high degree of efficiency. However, it has hitherto been unable to effect feedback control of the conditions of combustion by real time on-line operation. Now that it has been ascertained that there is a positive correlation between the intensity of light emitted by the $C_2$ radical and the amount of non-combusted fuel 440 in the ash as shown in FIG. 11, it is possible to effect feedback control of the combustion conditions of fuel by a real time on-line operation.

Thus, once the correlations between the intensity of light emitted by the $C_2$ radical on the one hand and the concentrations of oxygen, hydrogen and carbon monoxide in the exhaust gases and the amount of non-combusted fuel in the ash on the other are established as shown in FIG. 11, it is possible to determine at once the concentrations of oxygen, hydrogen and carbon monoxide in the exhaust gases and the amount of non-combusted fuel in the ash merely by collecting light from a flame through light collecting windows and analyzing the intensity of light of a specific wavelength emitted by the $C_2$ radical without the need to collect samples of gases and dust in the flue. This makes it possible to effect feedback control of the conditions of combustion by a real time on-line operation.

In performing the aforesaid control operation, use of a single piece of information is not enough to effect control of the conditions of combustion with a high degree of precision, and it is necessary that at least more than two pieces of information be simultaneously gathered and analyzed in a coordinated fashion before reaching a conclusion. The invention enables more than two pieces of information to be simultaneously obtained from the analyses of light emitted by chemical sources in a flame, and this enables control of the conditions of combustion to be effected with increased accuracy and precision.

Figure 12:
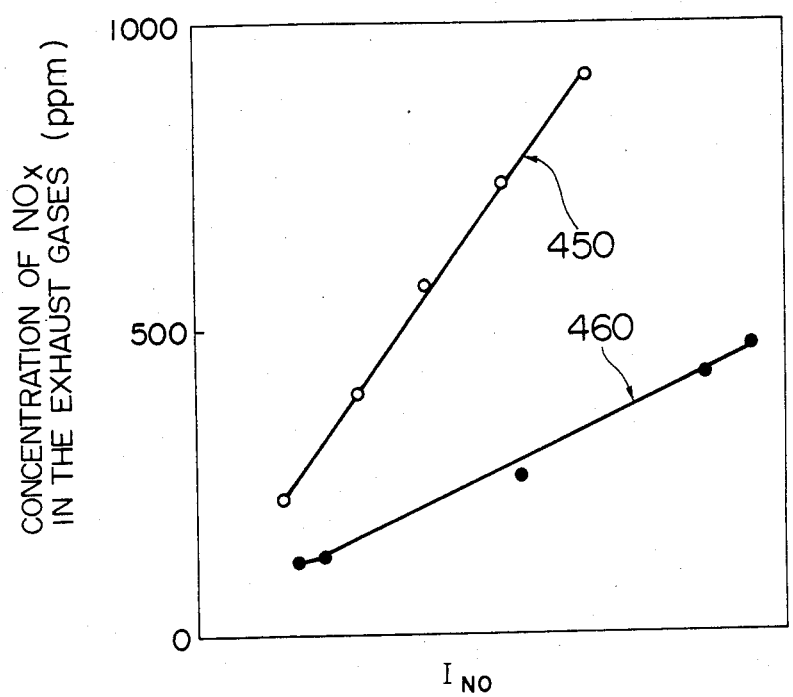
FIG. 12 is a diagrammatic representation of the relation between the intensity of light of NO* and the concentration of NOx in the exhaust gases.

FIG. 12 shows the relation between the intensity of light emitted by NO* and the concentration of NOx in the exhaust gases. In the figure, lines 450 and 460 represent cases difference from each other in the air ratio of combustion. It has been ascertained that the intensity of light emitted by NO* and the concentration of NOx in the exhaust gases are positively correlated to each other in both cases 450 and 460.

Thus, once the correlation between the intensity of light emitted by NO* and the concentration of NOx in the exhaust gases is established as shown in FIG. 12, it is possible to determine at once the concentration of NOx in the exhaust gases merely by collecting light from a flame and analyzing the intensity of light of a specific wavelength emitted by NO*. This makes to possible to effect feedback control of the conditions of combustion by a real time on-line operation.

Figure 13:
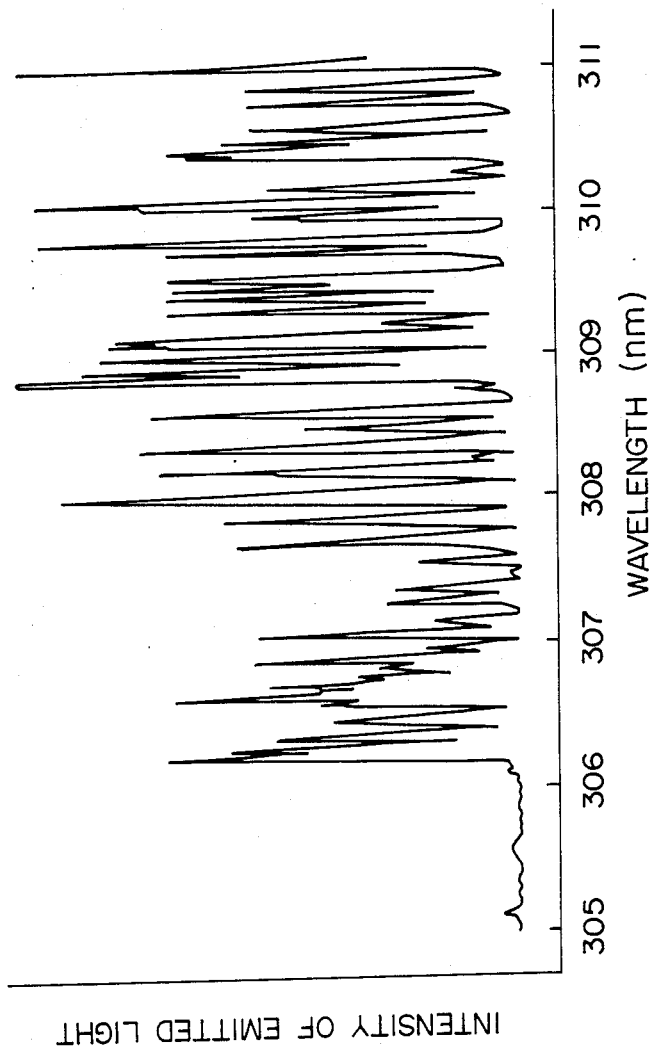
FIG. 13 is a diagrammatic representation of a spectral band of different wavelengths obtained from light of the OH radical.

FIG. 13 shows a spectrum of light emission of the OH radical that has been ascertained to exist widely in a flame which represents the result of an analysis generally referred to as a vibratory rotational spectrum of the OH radical. In the figure, there is shown a diagram in which the ordinate represents the intensity of light and the abscissa indicates the wavelength. Temperature can be determined by calculation done on the values of positions in the abscissa (wavelength) and positions in the ordinate (intensity of light emission) of a peak line of the spectrum. The calculation is done by the following equation:

$$l_n(I_\omega/\omega^4 \cdot P \cdot g) = -E/KT + \text{Constant} \qquad \text{Equation}$$

where $I_\omega$: the intensity of light emitted with a wavelength.

$\omega$: the inverse number of the wavelength of a spectral line.

P: the transition probability to an energy level E at which light of the wavelength $\omega$ is emitted.

g: the multiplicity.

K: Boltsman constant.

T: the absolute temperature.

g. has a value which is inherent to the substance or the OH radical, and P and E have values which are inherent to $\omega$. These values can be obtained by calculation.

Thus, by determining the intensity of the spectral line obtained by spectroscopin analysis, calculating the quantity of the left side, and plotting the quantity with respect to E, it is possible to obtain the value of T because the tilting of a straight line is 1/KT and K is a constant.

FIG. 13 shows one example of the results of spectroscopic analyses performed on the OH radical at an arbitrarily selected one point in a flame.

The observations made hereinabove may be summarized as follows. If light is collected at one point in a flame produced by the combustion of a fuel and spectroscopic analysis of the light is performed to obtain the vibratory rotational spectrum of an OH radical, then it is possible to obtain the temperature prevailing at the one point at which the light is collected by doing calculation on the vibratory rotational spectrum of the OH radical obtained by the spectroscopic analysis. Therefore, the distribution of temperature in the flame can be obtained by performing the operation described hereinabove in a plurality of positions in the flame.

Figure 14:
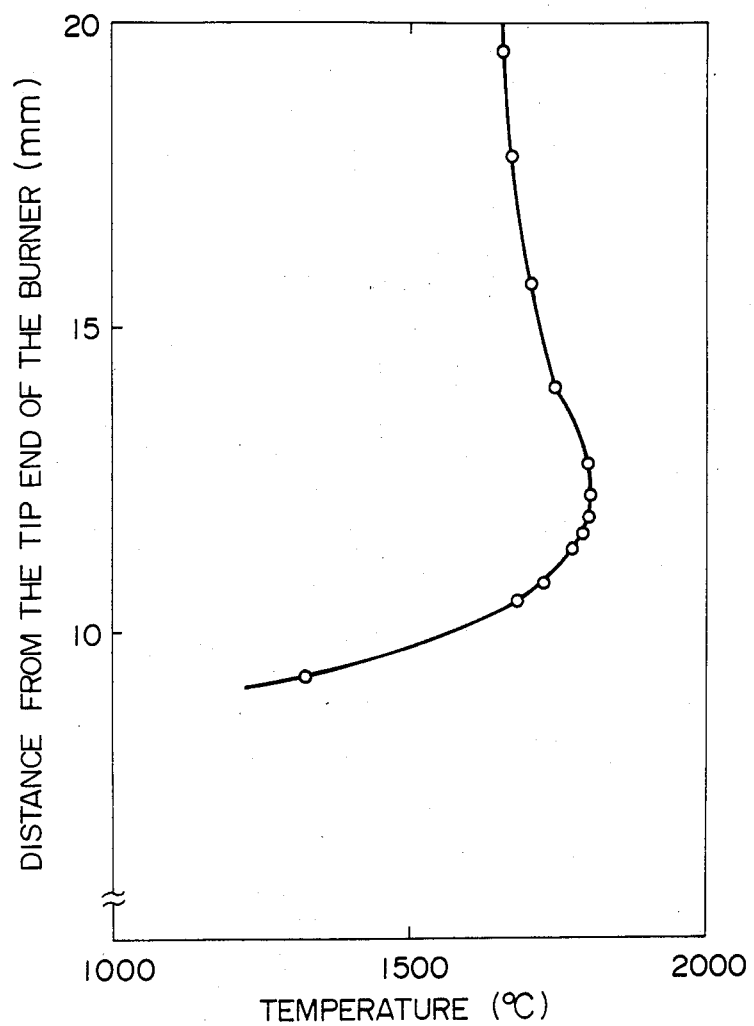
FIG. 14 is a diagrammatic representation of one example of temperature distribution in a flame.

FIG. 14 shows the distribution of temperature in a flame produced by the combustion of the fuel by the burner used in the device for experiments shown in FIG. 6.

In the prior art, it has hitherto been usual practice to insert thermocouples in a flame in the vicinity of a flame port of the burner to obtain a temperature distribution. This method of the prior art has suffered the disadvantage that difficulties are experienced in obtaining an accurate distribution of temperature due to the fact that the flame is disturbed by the insertion of the thermocouples. The invention obviates the disadvantage of the prior art and enables an accurate temperature distribution to be positively obtained because it is possible to determine the temperature of a flame by optical means without contacting the flame.

Thus, according to the invention, it is possible to positively obtain a temperature distribution in a flame in the vicinity of a flame port of a burner by optical means without contacting the flame by performing spectroscopic analyses of the light emission spectrum of the OH radical in the flame and inputting the results of spectroscopic analyses to a signal processing unit comprising calculation means for calculating a temperature distribution, a memory circuit for storing information on the temperature distribution in a flame produced at the time of optimum condition of combustion of the fuel, a comparator circuit for comparing the calculated temperature distribution with the temperature distribution stored in the memory circuit and outputting a signal, and a control circuit inputting an output signal from the comparator circuit and outputting a control signal. This makes it possible to control the conditions of combustion of the fuel by the control signal with a high degree of efficiency and precision based on the temperature distribution obtained by the spectroscopic analyses of the light collected from the flame.

As noted hereinabove, it is possible to collect light of chemical origin from a flame and subject the collected light to spectroscopic analyses to determine the conditions of combustion of the fuel based on the intensity of light or the pattern of emission of light in a specific band of wavelengths obtained spectroscopically. This makes it possible to effect control of the conditions of combustion of the fuel with a high degree of efficiency and precision by immediately coping with any change in the conditions of combustion that might occur. Moreover, the method described enables a lot of information to be obtained about the conditions of combustion based on spectroscopic analyses of light obtained from a flame without contacting the flame, and the conditions of combustion can be controlled based on the results of the spectroscopic analyses of a multiplicity of pieces of information.

Spectroscopic means is used for obtaining the intensity of light and the pattern of emission of light in a specific band of wavelengths of a flame. The spectroscopic means may be in the form of a spectroscope provided with a light detector, a filter or any other known instrument for performing a similar function.

No matter what method is used for collecting light from a flame, what is important is that the intensity of light and the pattern of emission of light in a specific band of wavelengths which may be selected arbitrarily. The data described hereinabove have been gathered by using the device for experiments shown in FIG. 6 or 8 which comprises a spectroscope equipped with a photomultiplier.

Figure 15:
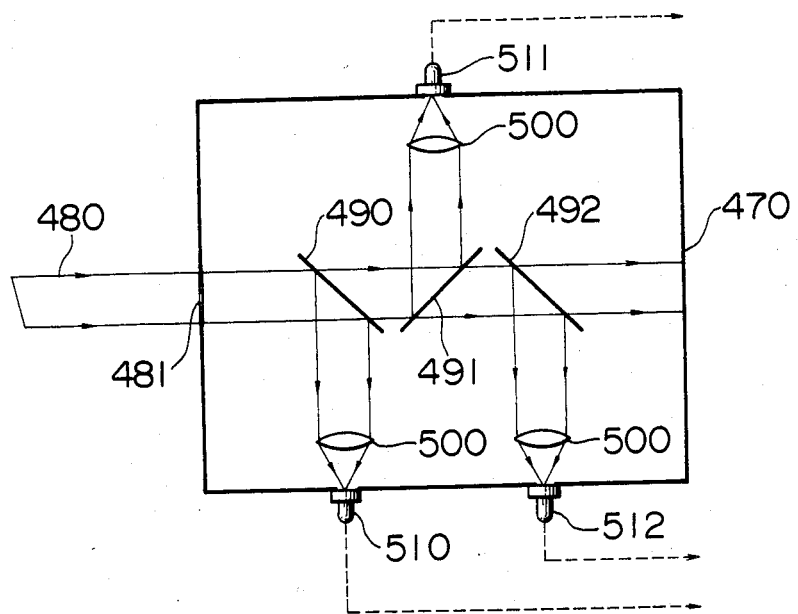
FIG. 15 is a view in explanation of one example of the filter box used for measuring the intensity of light emitted by a flame.

FIG. 15 shows an example of a filter box 470 used for determining the intensity of light. A light beam 480 collected from a flame is introduced into the filter box 470 through a light collecting window 481 formed in the box 470. The light beam 480 is successively passed through dichroic filters 490, 491 and 492 to allow certain wavelengths to pass therethrough while preventing the passage of other wavelengths. The dichroic filters 490, 491 and 492 may be selected arbitrarily selected to reflect any wavelength as desired. The light of any wavelength that is reflected by each of the dichroic filters 490, 491 and 492 is focused by a condenser lens 500 on one of light detectors 510, 511 and 512 as light of high intensity. Thus, the intensity of light of a desired wavelength can be detected at each of the photo-detectors 510, 511 and 512. The filter box 470 has been shown and described as being capable of reflecting three wavelengths of light. However, the invention is not limited to this specific number of wavelengths of light, and the light collected from a flame may be processed such that as many wavelengths thereof as possible can be reflected by means of the filter box 470. Thus, by using the filter box 470 of the type shown in FIG. 15, it is possible to simultaneously obtain a desired number of wavelengths of light collected from a flame and subject them to analysis, to thereby enable information about a lot of bands of wavelengths to be obtained simultaneously. This makes the filter box useful as means for gathering a lot of information about light collected from a flame and passing a judgement by taking into consideration a multiplicity of pieces of information in a coordinated fashion.

It has been shown and described hereinabove that light collected from a flame is subjected to spectroscopic analysis to obtain a specific band of wavelengths and that information is obtained about the air ratio and temperature of the flame, the concentrations of oxygen, hydrogen, carbon monoxide and NOx in the exhaust gases and the amount of non-combusted fuel in the ash based on the intensity of light and the pattern of emission of the light in the specific band of wavelengths by optical means without contacting the flame. As shown in FIG. 15, the use of the filter box 470 enables the collected light to be simultaneously separated into a multiplicity of wavelengths as desired. In the light collecting optical system shown in FIG. 4, the condenser lens may be moved back and forth to shift the focusing point. Thus, by using the filter box 470 shown in FIG. 15 in place of the light detector 58 shown in FIG. 4, it is possible to simultaneously obtain a multiplicity of pieces of information as described hereinabove with respect to a zone extending along different strata of the flame.

When a flame produced by the combustion of a fuel is not normal, it is possible to detect the abnormal conditions of combustion promptly with a high degree of precision as presently to be described.

Referring to FIGS. 16-a, 16-b and 16-c, a pulverized coal burner 540 is formed in a central portion thereof with a pulverized coal ejecting nozzle 520, and a combustion air supply nozzle 530 is concentrically located around the pulverized coal ejecting nozzle 520. The burner of this construction is usually used.

FIG. 16-a shows a flame 550 produced as the result of combustion of pulverized coal supplied in excess with a paucity of air. It will be seen that when the condition of combustion of the fuel is as described hereinabove, the flame 550 produced is lacking in a middle portion because the fuel is not combusted therein due to the lack of air.

The flame 550 shown in FIG. 16-b is lacking in its outer peripheral portion because the flame is extinguished in this portion due to excess air caused by an inordinate increase in air supply.

The flame 550 shown in FIG. 16-c is normal in shape with the supply of pulverized coal and the supply of air for combustion being balanced, to enable combustion to take place satisfactorily.

The flames 550 shown in FIGS. 16-a and 16-b are not desirable in shape because they indicate that the combustion of the fuel is not taking place with a high degree of fuel efficiency.

The methods of control of the flames that have hitherto been used have suffered the disadvantages, as described hereinabove, that a long period of time elapses before a change in the conditions of combustion causing the flame 550 to be shaped as shown in FIGS. 16-a and 16-b can be detected in the flue, and that such change is so delicate that difficulties are experienced in detecting it.

When the method according to the invention is used, it is possible to quickly and positively determine whether the flame 550 is normal in shape as shown in FIG. 16-c or abnormal in shape as shown in FIGS. 16-a and 16-b merely by examining light in a zone facing different strata of the flame 550 along a broken line.

More specifically, according to the invention, data on the flame 550 of normal shape shown in FIG. 16-c including the distribution of air ratio and the distribution of temperature in the flame which is determined based on the intensity of light and the pattern of emission of the light in a specific band of wavelengths in the flame are stored in a memory of a computer, and observations of the light in the zone along the broken line in FIGS. 16-a to 16-c are continuously made during operation of the burner 540. This makes it possible to take necessary steps as soon as the conditions of the flame 550 shown in FIGS. 16-a and 16-b are detected. That is, one only has to reduce the supply of pulverized coal when the flame 550 is shaped as shown in FIG. 16-a and reduce the supply of air for combustion when the flame 550 is shaped as shown in FIG. 16-b.

The flame 550 has a tendency such that once its shape becomes abnormal, difficulties are experienced in restoring the flame 550 to a normal shape. Thus, it would be advisable to detect the flame 550 in the process of transition from the normal shape shown in FIG. 16-c to the abnormal shape shown in FIGS. 16-a or 16-b. After the flame 550 has shifted to the condition shown in FIGS. 16-a or 16-b, it would be possible to detect the abnormal shape of the flame 550 by means of a television camera. However, when the abnormality of the shape of the flame 550 is not apparent or when the shape of the flame 550 is in transition from normal to abnormal, difficulties would be experienced in detecting the change in the shape of the flame 550.

This disadvantage of the prior art is obviated by the invention in which light of a flame is spectroscopically analyzed and the intensity of light and the pattern of emission of the light are determined to obtain their distribution in the flame. This makes it possible to detect a minute change in the light emanating from the flame, thereby enabling transition of the flame from the normal shape of FIG. 16-c to the abnormal shape of FIG. 16-a or FIG. 16-b. It is also possible to detect whether the flame is in transition to the shape of FIG. 16-a or FIG. 16-b, to enable control of the flame to be effected with a high degree of precision.

The observations described hereinabove can be made because the light emanating from the flame is spectroscopically analyzed to select a specific band of wavelengths and the intensity of light and the pattern of emission of the light at each wavelength are studied in a coordinated fashion. At the stage of transition of the flame from a normal shape to an abnormal shape, no change might occur in the distribution of the intensity of light in a certain wavelength but a change might occur in the distribution of the intensity of light in other wavelengths.

For example, when the flame changes from the normal shape shown in FIG. 16-c to the shape shown in FIG. 16-a, the supply of fuel through the pulverized coal supply nozzle 520 in the central portion of the burner 540 gradually increases. At this time, the intensity of light emitted by the OH radical or the pattern of intensity of emission of the light by the OH radical having information about temperature shown almost no change.

The temperature of the flame should be falling because the combustion of fuel tends to become imperfect in the vicinity of the center of the burner. However, owing to the radiation of heat from outer layers of the flame formed in concentric layers in the central portion of the burner, the temperature of the flame shows little change, so that the intensity of light emitted by the OH radical and the pattern of emission of the light by the OH radical shows almost no change.

Meanwhile, the distribution of the intensity of light emitted by the $C_2$ radical and CH radical shows a change. That is, in the vicinity of the front surface of the pulverized coal supply nozzle 520, the intensity of light emitted by the $C_2$ radical and CH radical shows a tendency to increase. The $C_2$ radical and CH radical are said to be forerunners of soot precipitating from the vapor phase. The increase in the intensity of light emitted by the radicals which are precursors of soot precipitating from the vapor phase would be accounted for by the fact that zones of imperfect combustion are created locally in the vicinity of the pulverized coal supply nozzle by a graudla increases in the supply of the fuel.

Thus, in view of the foregoing description, it will be appreciated that detection of the transition of a flame from a normal shape to an abnormal shape can be made possible by making observations of the light emitted by the flame and analyzing the results in a coordinated fashion according to the invention, to thereby effect control of the conditions of combustion with a high degree of precision.

Figure 17:
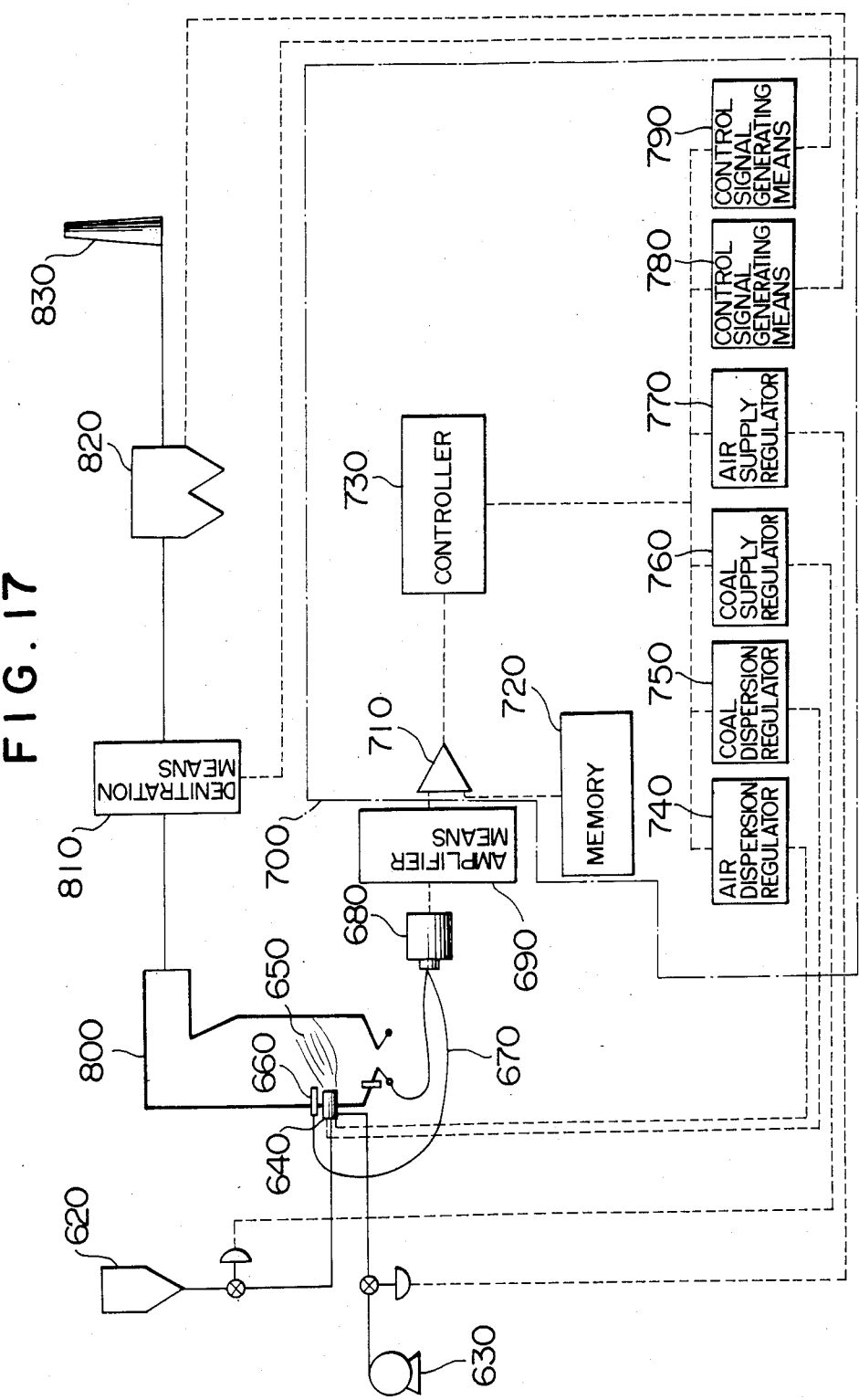
FIG. 17 is a view of the furnace system comprising one embodiment of the invention, showing the manner in which control of the conditions of combustion of the fuel is effect according to the invention.

FIG. 17 shows one embodiment of the furnace system in conformity with the invention. A flame 650 emits light which is collected by light collecting means 660 and led to spectroscopic means 680 via an optical fiber 670. The spectroscopic means 680 is equipped with a transducer means for converting optical signals each representing the intensity of light or the pattern of emission of the light in a specific wavelength of light emanating from a flame to electric signals which are amplified by amplifier means 690 and led to a control unit 700. The amplifier means 690 amplifies the electric signals produced by the transducer means by conversion from the optical signals representing the intensity of light and the pattern of emission of the light in an arbitrarily selected band of wavelengths. The control unit 700 comprises a memory 720 storing data about the intensity of light and the pattern of emission of the light in a specific band of wavelengths observed when the conditions of combustion are optimized, a comparator means 710 for comparing the signals from the amplifier means 690 with the outputs of the memory 720, and a controller 730 for outputting a signal for effecting control of the conditions of combustion of the fuel. The control unit 700 further comprises an air dispersion regulator 740, a pulverized coal dispersion regulator 750, a pulverized coal supply regulator 760 and an air supply regulator 770 to which the output of the controller is supplied.

The outputs of the control unit 700 are utilized for regulating the amount of air and the amount of fuel supplied to a burner 640 and the dispersion of air and fuel at the outlet of a flame port of the burner 640. More specifically, the output of the air supply regulator 770 is led to an automatic control valve mounted in a line for supplying air from a blower 630 to the burner 640 to regulate the amount of air supplied to the burner to an optimum level. The output of the pulverized coal supply regulator 760 is led to an automatic control valve mounted in a line for supplying pulverized coal from a pulverized coal supply hopper 620 to the burner 640 to an optimum level. The outputs of the air dispersion regulator 740 and pulverized coal dispersion regulator 750 are outputted to air dispersion regulator drive means and pulverized coal dispersion regulator device means (see FIG. 18), respectively, which are mounted to the burner 640, to thereby control the dispersion of the air and pulverized coal to optimum conditions.

Figure 18:
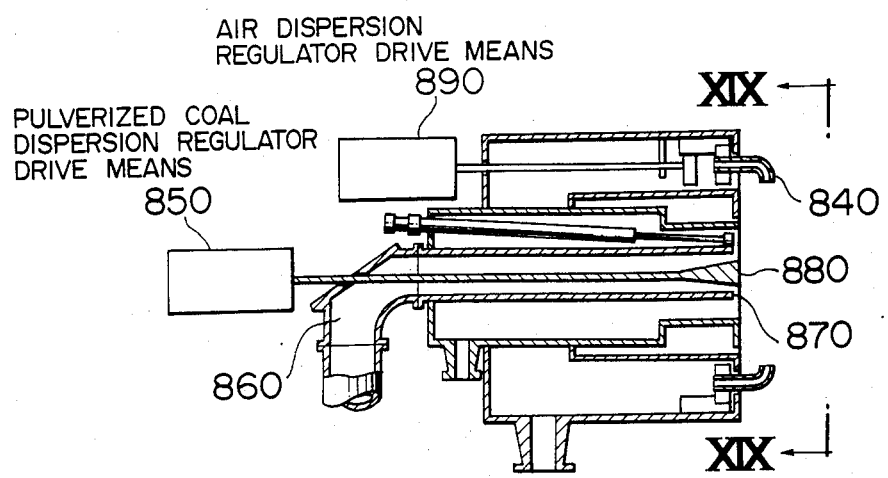
FIG. 18 is a vertical sectional view of one example of the burner used for effecting control of the flame as shown in FIG. 17.
Figure 19:
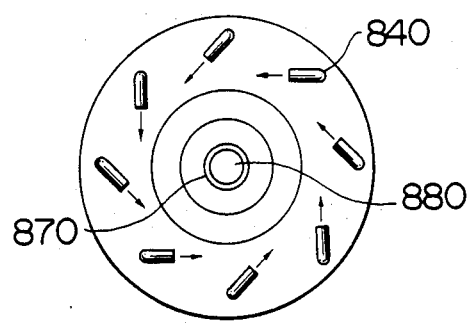
FIG. 19 is a sectional view taken along the line XIX—XIX in FIG. 18.

The dispersion of the pulverized coal and air will be described by referring to FIGS. 18 and 19. The output of the air dispersion regulator 740 shown in FIG. 17 is led to the air dispersion regulator drive means 890, and the dispersion of the air is controlled by suitably altering the direction in which the air is ejected through three-dimensional air nozzles 840. The output of the pulverized coal dispersion regulator 750 shown in FIG. 17 is led to the pulverized coal dispersion regulator drive means 850. The pulverized coal pneumatically transported to the burner is ejected through a nozzle slit 870 after being transported thereto via a line 860. Control of the dispersion of the pulverized coal is effected by regulating the degree of opening of the nozzle slit 870 by inwardly and outwardly moving a cone 880 disposed in a pulverized coal ejecting nozzle opening.

There are limits, however, to the control of the dispersion of the air and pulverized coal that can be effected merely by regulating the burner.

When the situation beyond the power of the means of control described hereinabove occurs, control of the conditions of combustion is effected by the furnace system according to the invention.

A coal-burning electric power generating plant generally comprises a furnace 800, denitration means 810, dust collector means 820 and smokestack means 830, as shown in FIG. 17. The denitration means 810 usually increases and decreases the amount of a reducing agent for reducing NOx in accordance with a change in the load. The dust collector means 820 performs a steady-state operation because of its inability to cope with a change in load.

The furnace system as a whole is intended to reduce the amount of non-combusted fuel and the concentration of NOx. When the fuel is pulverized coal, it is possible to reduce the amount of non-combusted fuel if the fuel is caused to burn substantially in perfect combustion, although the concentration of NOx in the exhaust gases increase. Conversely, if the fuel is allowed burn in imperfect combustion, it is possible to reduce the concentration of NOx in the exhaust gases, although the amount of non-combusted fuel increases. Stated differently, it is impossible to reduce the amount of non-combusted fuel and the concentration of NOx at the same time merely by controlling the conditions of combustion of the fuel. The concentration of NOx increases when the conditions of combustion suit reduction in the amount of non-combusted fuel; the amount of non-combusted fuel increases when the conditions of combustion suit the reduction in the concentration of NOx. As noted hereinabove, the dust collector means 820 is unable to cope with a change in load satisfactorily. Thus, the amount of non-combusted fuel in the exhaust gases remains essentially constant.

In a burner, the amount of the non-combusted fuel can be readily reduced by causing perfect combustion of the fuel to take place. However, this results in the concentration of NOx in the exhaust gases becoming high.

The furnace system according to the invention is essentially intended to control the conditions of combustion of the fuel in the burner. However, the burner system may be constructed such that a signal can be outputted to an exhaust emission control system disposed posterior to the furnace 800, e.g. coupled to a flue of the furnace. When the flame produced in the furnace 800 is found to be of the type which might cause an increase in the concentration of NOx in the exhaust gases, a signal may be supplied from a reducing agent amount control signal generating means 790 of the control unit 700 to the denitration means 810 to increase the amount of the reducing agent so as to thereby reduce the concentration of NOx in the exhaust gases. When the flame produced is found to be of the type which might increase the amount of the non-combusted fuel in the exhaust gases, control of the conditions of combustion of the fuel is effected in a manner to enable the fuel to burn in perfect combustion, because it is possible to raise the voltage between the electrodes of the dust collector means 820 to cope with a change in the load as noted hereinabove. Stated differently, control of the combustion conditions is effected by feeding an increased amount of air to the burner. However, if this step is taken, then the flame shifts to the type which might cause an increase in the concentration of NOx, so that it is necessary to simultaneously generate and supplys signal to the denitration means 810 to increase the amount of the reducing agent.

If improvements are made in the dust collector means 820 to enable the voltage between the electrodes to be varied in accordance with a change in the load in the future, it will be possible to cause an inter-electrode voltage control signal generating means 780 of the control unit 700 to generate a signal to directly control the dust collector means 810.

Stated differently, when the flame produced in the furnace 800 tends to cause an increase in the amount of non-combusted fuel in the ash, one only has to take steps to supply a signal to the dust collector means 820 to raise the voltage between the electrodes.

From the foregoing description, it will be appreciated that in the furnace system according to the invention, it is possible to take steps to reduce the amount of the non-combusted fuel in the ash and the concentration of NOx in the exhaust gases by controlling the combustion of the fuel by the burner and also by controlling the exhaust emission control system located posterior to the furnace 800 including the denitration means 810 and dust collector means 820.

According to the invention, light emitted by a flame in a burner is subjected to spectroscopic analyses to select a specific band of wavelengths and determine the intensity of light and the pattern of emission of the light. Based on the results obtained, the conditions of combustion of the fuel are judged without contacting the flame, to thereby control the conditions of combustion of the burner to reduce the amount of non-combusted fuel in the ash and the concentration of NOx in the exhaust gases. Thus, observations of the conditions of combustion of the fuel can be made in a coordinated fashion based on a multiplicity of pieces of information about the chemical sources of light of different wavelengths. This makes it possible to perform control of the combustion conditions of the fuel quickly and with a high degree of precision because observations of the flame itself form the basis of control.

What is claimed is:

1. A furnace system comprising:
   a furnace for burning a fuel ejected from a burner;
   combustion condition determining means including a light collecting optical system for collecting light emitted by a flame to obtain information about the conditions of combustion of the fuel in a zone of the flame extending through different strata thereof by moving a point at which the light is collected; and
   means for at least one of monitoring and controlling the flame by utilizing signals outputted by the combustion condition determining means for adjusting the amount of at least one of the fuel and air supplied to the furnace.

2. A furnace system as claimed in claim 1, wherein said combustion condition determining means further includes spectroscopic means for subjecting the light collected by the light collecting optical system to spectroscopic analyses to select a specific band of wavelengths, and a determining means for determining the oonditions of combustion of the fuel based on the intensity of light and the pattern of emission of light of the specific band of wavelengths.

3. A furnace system as claimed in claim 8, wherein said means for at least one of monitoring and controlling the flame and said means for controlling said exhaust emission control means include control unit means for controlling the amount of air ejected from the burner, the amount of the fuel ejected from the burner, and the angles at which the air and fuel are dispersed into the furnace as they are ejected from the burner.

4. A furnace system as claimed in claim 8, wherein said exhaust emission control means include at least one of a denitration means, and a dust collector means.

5. A furnace system as claimed in claim 2, wherein said specific band of wavelengths selected by the spectroscopic analyses of the light conducted by said spectroscopic means comprises a specific band of wavelengths enabling information to be obtained about the temperature and air ratio of the flame, the concentrations of nitrogen oxides and hydrogen in the exhaust emission and the amount of non-combusted fuel in the dust.

6. A furnace system as claimed in claim 2, wherein said specific band of wavelengths selected by the spectroscopic analyses of the light comprises wavelengths in which light is emitted by an OH radical, an NH radical, a CN radical, a CH radical, a $C_2$ radical and nitrogen oxides.

7. A furnace system as claimed in claim 2, wherein said light collecting optical system comprises a plurality of lenses for collecting from two directions light emitted from inside the flame and obtaining information about the conditions of combustion of the fuel at a point at which optical axes of the lenses cross each other, and moving means for moving the optical axis of at least one of the lenses.

8. A furnace burner system according to claim 1, further comprising exhaust emission means connected to a flue of the furnace, and means for controlling the exhaust eimission means by utilizing signals outputted by the combustion condition determining means.

* * * * *